United States Patent [19]

Bond

[11] Patent Number: 5,383,070
[45] Date of Patent: Jan. 17, 1995

[54] METHOD AND DEVICE FOR MEASURING DISK DRIVE ALIGNMENT

[76] Inventor: Charles R. Bond, 502 Sark Ct., Milpitas, Calif. 95035

[21] Appl. No.: 616,350

[22] Filed: Nov. 21, 1990

[51] Int. Cl.$^6$ ............... G11B 5/596; G11B 27/36; G11B 5/82
[52] U.S. Cl. ............... 360/77.04; 360/77.02; 360/31; 360/135
[58] Field of Search ............ 360/77.04, 77.11, 135, 360/31, 77.02; 324/210, 212

[56] References Cited

U.S. PATENT DOCUMENTS

| | | | |
|---|---|---|---|
| 4,321,636 | 3/1982 | Lenz | 360/77.02 |
| 4,458,275 | 7/1984 | Monti | 360/78 |
| 4,513,331 | 4/1985 | Baker et al. | 360/75 |
| 4,513,333 | 4/1985 | Young et al. | 360/31 X |
| 4,562,494 | 12/1985 | Bond | 360/75 |
| 4,608,618 | 8/1986 | Sturtevant-Stuart | 360/31 X |
| 4,754,343 | 6/1988 | Cascio, Sr. et al. | 360/31 |
| 4,992,893 | 2/1991 | Kanai et al. | 360/77.04 |
| 5,023,856 | 6/1991 | Raaymakers et al. | 369/275.1 |

FOREIGN PATENT DOCUMENTS 0121590 10/1984 European Pat. Off. ......... 360/77.04

OTHER PUBLICATIONS

Xerox disclosure Journal vol. 1 No. 2 Feb. 1976 p. 75 W. B. Watson "Method of forming alignment".
"Computer technology Review" summer 1984 pp. 83, 86, 87 C. Bond System level drive dish tests can be performed efficiently by the user.

*Primary Examiner*—Aristotelis M. Psitos
*Assistant Examiner*—Varsha A. Kapadia

[57] ABSTRACT

A test disk is used to measure disk drive alignment and other parameters without removing the drive from its computer system and without any need for special test equipment. It includes a pair of prerecorded signal tracks separated by a gap smaller than the width of the head so that one track is used for providing computer readable signals and the other is used to inject variable interference into the composite signal under the head. Multiple pairs of tracks at differing radii are included for measuring drive alignment and other parameters. The method for measuring alignment and other parameters suppresses measurement errors due to disk signal modulation and changes in track radius. Alignment testing requires only a single measurement and is capable of resolving the measurement to the nearest bit so that maximum accuracy is achieved.

4 Claims, 2 Drawing Sheets

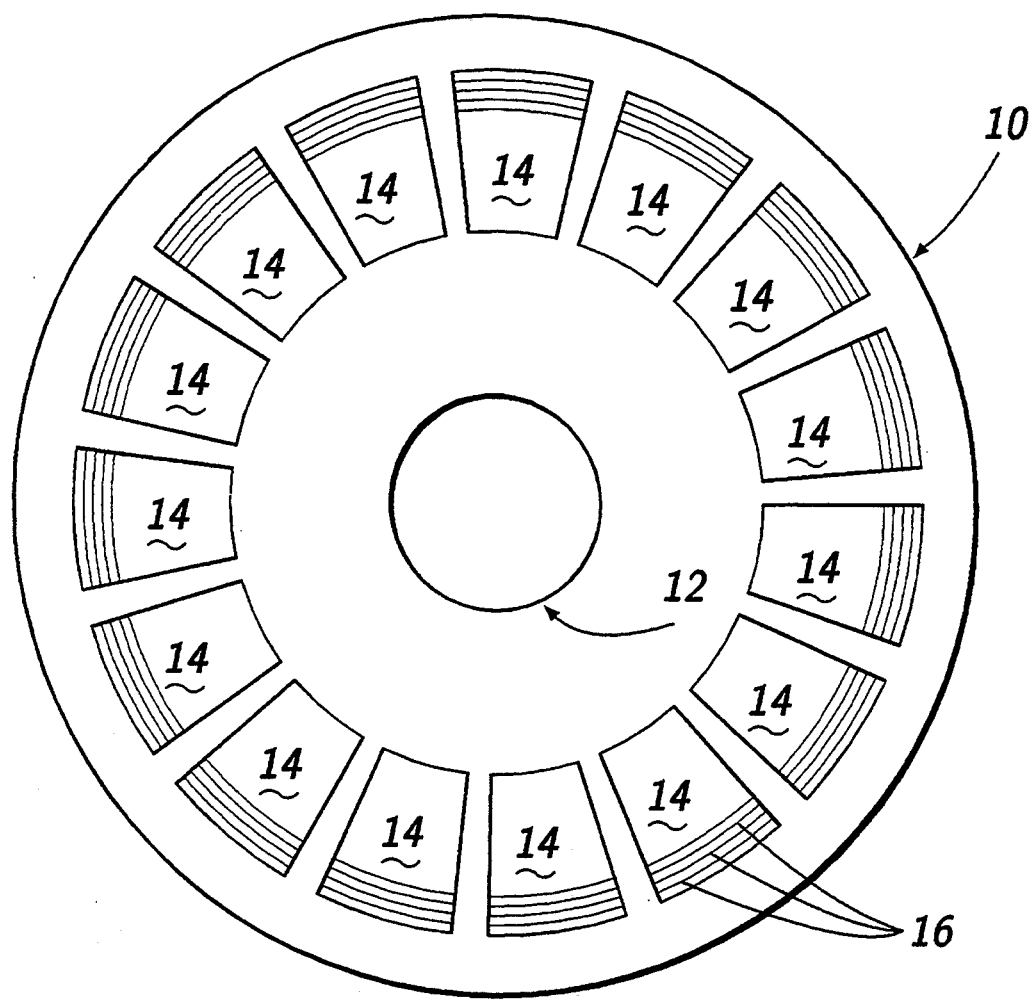
Fig._1
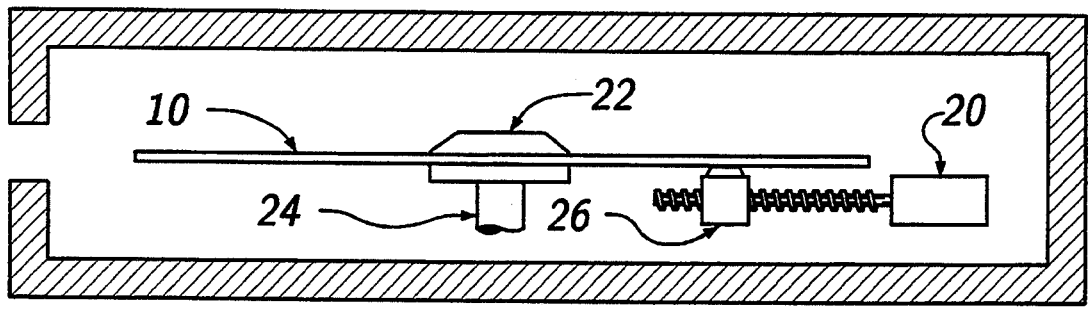
Fig._2

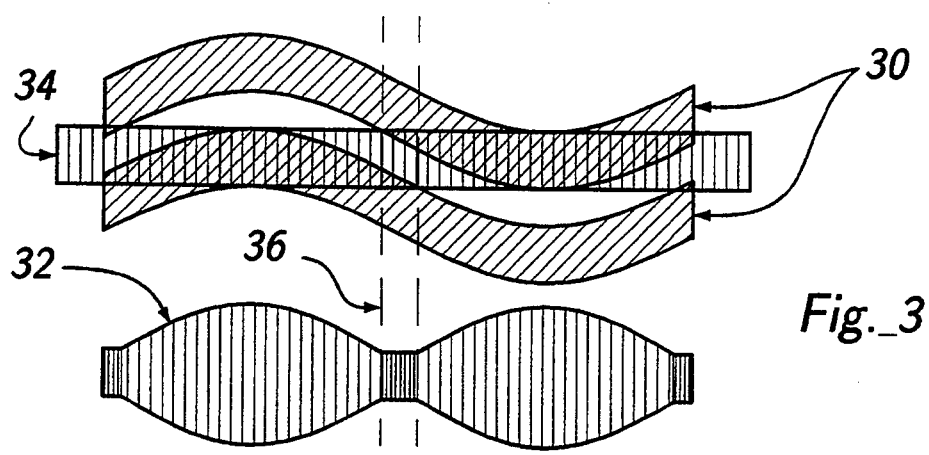
Fig._3
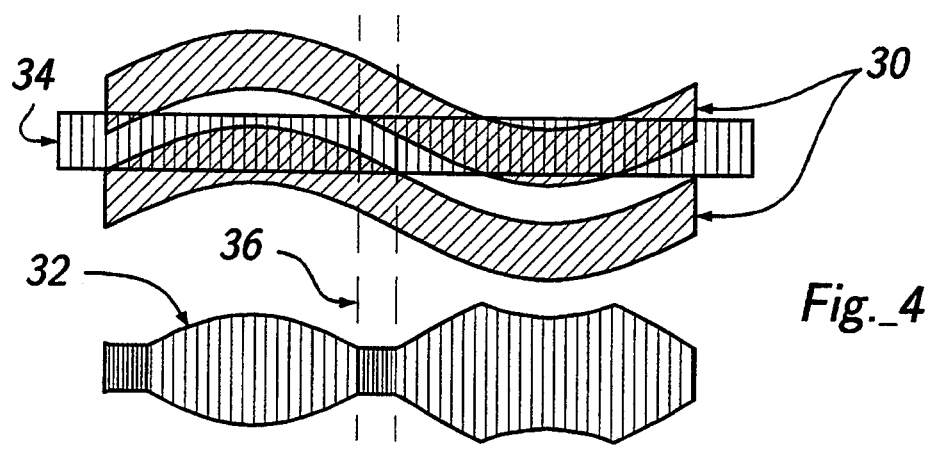
Fig._4
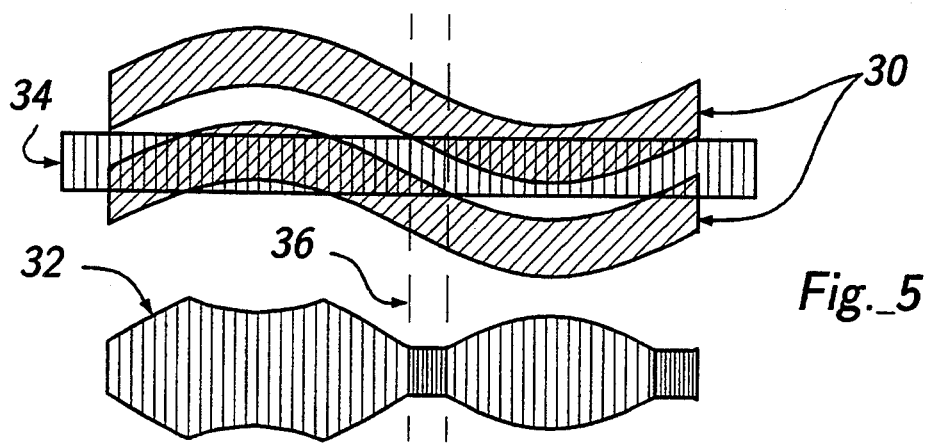
Fig._5
|← 360° →|

METHOD AND DEVICE FOR MEASURING DISK DRIVE ALIGNMENT

BACKGROUND

1. Field of the Invention

The invention relates to computer systems with disk drives having motor driven head positioners wherein the drives are preadjusted to access data tracks at standard locations. Said drives are subject to the effects of wear, aging, mechanical drift and corrosion resulting in the need for periodic maintenance and realignment. In particular, floppy disk drives are especially sensitive to alignment problems because they are expected to maintain alignment within the limits required for interchangeability. Said limits are governed by accepted standards, e.g. ANSI X3.82-1980.

A machine readable alignment test disk offers the computer user or owner a means to verify correct adjustment of said drive without the need to remove it for testing, to disassemble the system, or to employ the services of a trained technician with special equipment.

2. Discussion of Prior Art

Several attempts have been made to measure the alignment of disk drives using prerecorded disks. U.S. Pat. No. 4,513,331 issued to Baker, et al. uses alternate offset and progressive offset sectors along a track to provide reference signals for testing head position. U.S. Pat. No. 4,458,275 issued to Monti, and U.S. Pat. No. 4,562,494 issued to Bond use progressive offset tracks to provide reference signals. Pat. No. 4,608,618 issued to Sturtevant-Stuart uses combinations of spiral tracks to provide reference signals.

By prerecording a suitable arrangement of special tracks on these diagnostic or alignment disks, it is taught that radial alignment, disk centering, mechanical hysteresis, and other parameters of interest can be adequately measured by persons with no special equipment or training.

All of the above methods rely on eventual failure of the playback system to correctly read prerecorded sectors in the presence of incrementally decreasing signal amplitude. The assumption is that signal amplitude threshhold detection provides a sufficiently stable reference for subsequent position calculations. However, since disk drives differ appreciably in their dynamic recovery threshholds, and because magnetic disks differ in absolute signal amplitude from one to the other, a two-point measurement is required. Typically, one measurement is taken with the reference sectors or tracks progressively offset toward the center of the disk until a failure occurs, and a second measurement is taken with the reference sectors or tracks progressively offset toward the outside of the disk until a similar failure occurs. By this means the nominal center for the head under test is computed to be half-way between the relative centers of the reference sectors or tracks at which failures were encountered. Briefly, the factors which affect signal amplitude are expected to be the same at both measurement points, hence the two points are alleged to represent equal off-track amounts.

Nevertheless, even after the two-point measurement is made, a significant source of error remains in all the above cited methods. This residual error exists because magnetic disks are not absolutely uniform in respect to those parameters which affect signal amplitude. Signal amplitude variations will occur due to differences in coating thickness across the surface of the disk, due to variations in average magnetic particle density in the coating mix, and due to variations in the average magnetic particle orientation on the disk. These amplitude variations, commonly called envelope modulation, will cause differences in the failure threshholds at the two points used for determining alignment. Furthermore, the component of signal amplitude variation due to non-uniformity of the disk cannot be distinguished from the component of amplitude variation due to track offset. Thus, there is an inherent, non-removable error associated with all these two point measurement methods. A problem with signal threshhold measurements is cited in U.S. Pat. No. 4,513,333 issued to Young et al., however the solution proposed there does not provide a measure of alignment, but rather provides pass/fail results based on a comparison of the head alignment with predetermined acceptable limits. Furthermore, any extensions of the method to allow making an approximate measure of alignment still require multiple point measurements.

A second problem with the above methods which affects parameter measurements that require readings to be taken on multiple tracks is that the signal amplitude from a disk varies in proportion to the track radius. This variation in amplitude conforms with known physical laws relating the output of a magnetic transducer (head) to the linear velocity of the media under the head. Said variations are not discussed in any of the prior art specifications and no compensation methods are cited. Absent any compensation, however, the signal loss caused by changes in track radius cannot be distinguished from signal loss caused by track offset.

A third problem which affects all the above methods is that the alignment measurement is quantized, i.e. the offsets are multiples of some basic incremental distance. Each incremental change in offset corresponds with a sector or other block of data. Hence, whatever arrangement of tracks and sectors are chosen, only a finite and relatively small number of measured values can be deduced.

SUMMARY OF THE INVENTION

It is an object of the present invention to provide a means for measuring head alignment, hysteresis, clamping error, positioner linearity, and positioner skew of a disk drive.

It is a further object of the present invention to provide a means by which a non-technical person can easily perform tests and measurements of said parameters without the need for an oscilloscope or other test equipment.

It is a further object of the present invention to provide a means by which said parameters can be tested without disassembly of the system containing the disk drive.

It is a further object of the present invention to provide a means by which measurement accuracy can be enhanced by suppressing errors due to signal modulation.

It is a further object of the present invention to provide a means by which measurement accuracy can be enhanced by suppressing errors due to changes in track radius.

It is a further object of the present invention to provide a means by which the aforementioned parameters can be measured with the maximum resolution for a digital test, i.e. single bit resolution.

It is a further object of the present invention to provide a means by which alignment can be measured using a only single measurement on a given track.

It is a further object of the present invention to provide a means by which other parameters can be tested with fewer measurements than heretofore required.

A typical embodiment of the present invention comprises a disk with one or more pairs of eccentric tracks containing machine readable information. These tracks are prerecorded on a special drive or recording fixture with a slightly offset disk clamping mechanism. Said eccentric track pairs are separated by a gap, commonly called an intertrack gap, which is less than the width of the record/playback head in the device under test. By suitable placement of said track pairs within the accessible portion of the disk surface, a variety of important disk parameters may be accurately measured including head alignment, positioner hysteresis, positioner linearity, positioner skew, and disk clamping error.

The machine readable information is prerecorded in sectors which may vary in number from 1 to the maximum allowable for each given computer system. The size may vary in accordance with the objectives of the present invention, as will be explained later.

Alignment measurements are taken by inserting the disk in a disk drive and positioning the head on a specific track location corresponding to the location of an eccentric track pair. During the course of one revolution of the disk under the head, portions of the signal induced in the head will be from one of the eccentric tracks and portions will be from the other. Between these signal areas will be an area in which signals from the two tracks overlap under the head. The electronics read channel in the drive will be able to read information in the areas which provide signals from one eccentric track or the other as it comes under the head, but will not be able to read information from either track during the period when the signals overlap. Thus, if data are being recovered from one of the eccentric tracks, at some position along the track interference from the signal on the other track will occur and induce a read failure.

In the present invention failure points are resolved to the nearest bit, rather than the nearest sector. This is done by assuring that the failure points will occur in the middle of a data field. With that condition met, the data recovered from the disk can be scanned and compared with the known, prerecorded contents of the data field. The point of first mismatch is the measurement point of interest. Since the eccentric tracks provide a smoothly and continuously changing offset, the measurement resolution is greatly increased over that of the prior art in which full sectors or blocks of information are the smallest measurable increments.

To understand the advantage of deducing positional information from measured interference testing, as opposed to signal amplitude threshhold testing, it is necessary to consider the design criteria of the data recovery electronics in a typical drive. Observe that disk drives are purposefully designed to be insensitive to variations in signal amplitude. Data are recovered by sensing peak positions. Within certain limits, peak amplitudes have no bearing on data recovery, i.e. a properly designed drive can perform acceptably in the presence of low amplitude media, signal modulation and fading, changes in track radius, and dirt or contamination on the head. It is to be understood that some sources of signal variation, notably modulation, cannot be detected or compensated by the inventions described in prior art. Said inventions rely on gradual signal loss, from whatever cause, to induce read failures which are then attributed to signal loss due to track offset. Errors will occur whenever the local signal amplitude conditions differ at the two measurement points used for testing.

Unlike prior art, the present invention relies on the injection of controlled noise into the data recovery system to induce failure. By this means, any cause of signal amplitude variation which affects the reference signal and noise in equal proportion will not introduce errors into the measurement.

In the present invention we utilize one of the eccentric tracks as a source of readable signals, and the other track as a source of gradually increasing interference (noise). The interfering track can be modeled as a noise source even if the same data are recorded on both tracks because the tracks are not synchronized with each other and will interfere whenever they are both sensed by the head.

It is well known that digital data recovery fails when the signal to noise ratio falls below 20 db. This particular failure mode is insensitive to absolute signal level and is therefore insensitive to any signal amplitude variations which affect the signal source and noise source in equal proportion. But envelope modulation has the property of affecting both equally because the components of modulation are relatively long range phenomena when compared with a track width. Thus if the local conditions at a measurement point are such that the media is thinner or thicker than the average thickness across the surface, the amplitudes of both the signal track and the noise track are reduced or increased in the same proportion. The net result is that the effects of modulation are suppressed and no measurement error is introduced by said modulation. Similarly, changes in track radius affect the signal and noise in the same proportion. Hence, errors caused by taking multiple measurements on different tracks are suppressed.

Briefly, instead of observing the point at which signals fade below the recoverable threshhold, a point which is dependent on many indistinguishable factors, we introduce controlled noise into the signal whereby said noise is the dominant factor in determining the recoverable threshhold. Accordingly, in the present invention the point of failure for a given head position will be determined consistently even for alignment test disks with differing signal amplitude and modulation levels, regardless of the track position at which testing is conducted. Furthermore, alignment may be accurately tested with only a single measurement, as it is no longer necessary to 'subtract out' absolute signal levels, channel gain, or track position from the measurements in order to deduce the alignment.

An advantage of the present invention is that alignment, hysteresis, positioner linearity, positioner skew, and clamping error of a disk drive can be measured by a non-technical person.

A further advantage of the present invention is that said parameters can be tested without the need for an oscilloscope or other equipment.

A further advantage of the present invention is that said parameters can be tested without disassembly of the system containing the disk drive.

A further advantage of the present invention is that potential measurement errors due to signal modulation are suppressed.

A further advantage of the present invention is that potential measurement errors due to changes in track radius are suppressed.

A further advantage of the present invention is that said parameters can be measured with maximum resolution.

A further advantage of the present invention is that alignment can be measured with only a single measurement.

A further advantage of the present invention is that other parameters can be measured with fewer measurements than heretofore required.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 1 is a diagrammatic top view of a typical flexible magnetic storage disk illustrating the location of data on such a disk.

FIG. 2 is a diagrammatic view of a disk drive indicating the disk mounting assembly and the head positioning assembly.

The upper portion of FIG. 3 is linearized diagrammatic top view of a pair of eccentric tracks as they would appear to a head under test. The lower portion of the figure is a graph of the corresponding head signal as it would appear on an oscilloscope. This figure illustrates the relative position of the head for a drive which is properly aligned.

FIG. 4 contains the same views as in FIG. 3 except that it illustrates the relative position for a head which is misaligned (offset) by 20% of a track width from the correct location toward the outside of the disk.

FIG. 5 contains the same views as in FIG. 3 except that it illustrates the relative position for a head which is misaligned (offset) by 20% of a track width from the correct location toward the center of the disk.

DESCRIPTION OF THE PREFERRED EMBODIMENT

FIG. 1 illustrates a typical floppy disk designated with the reference number 10. The data stored on disk 10 are stored on concentric tracks, some of which are illustrated and designated with the reference number 16. Tracks are counted from 0 starting with the outermost track and proceeding inward to the innermost track. Within a track, data are further blocked into zones called sectors, designated by reference number 14. The radii of the track centers in floppy disks are governed by ANSI standards and, in order to support interchangeability of media, all disk drive manufacturers design and adjust their drives to conform with those standards.

Within each sector, data are recorded as fixed length strings of digital information bits with an appended checksum. The number of sectors on a track, and the length of a record can vary according to the requirements at hand. Each data record is immediately preceded by a sector ID field which identifies the track number, the sector number, the head number (0 or 1 to distinguish the sides on double sided media), and a sector size identifier. Hence, computer system can request to read data from a given sector on a given track on a given side and if the ID block is found the data field will be returned to the system.

The disk is also provided with a mounting hole designated by reference number 12 which is used to clamp the disk in the drive so that it may be secured and rotated by the spindle motor.

The mechanical portions of a disk drive which are relevant to the present invention are illustrated in FIG. 2. The head positioning mechanism 20 controls stepping from track to track of the read/write head assembly 26. This mechanism is preadjusted by the factory and maintained thereafter to assure conformance with the accepted track location standards. The disk 10 is clamped by the clamping assembly, partially indicated in 22, to the motor spindle 24. Drive clamping assemblies are designed to center the disk with respect to the center of the motor spindle so that concentric tracks recorded on one drive will be concentric when read by another.

In the preferred embodiment of the present invention, a standard 40 track disk drive with 48 tracks per inch will be utilized. For this device the track spacing is the inverse of 48, i.e. 0.02083 inches, approximately 20 mils. The head (track) width, also governed by ANSI standard, is approximately 12 mils. Thus the spacing between tracks is about 8 mils. Using these values it is clear that the gap between tracks is less than a track width as required. The eccentric tracks are prerecorded on a special drive or fixture which has its clamping assembly modified to clamp the disk at a known offset from the spindle center. For the preferred embodiment, this offset should be one-half a track width (10 mils). By this means, along with suitable adjustment of the positioner mechanism, eccentric tracks can be prerecorded in accordance with the objects of the present invention. In the preferred embodiment, the eccentric tracks are located so as to be readable by the center track (Track 19) of the drive under test. Said eccentric tracks are prerecorded with standard track width and standard intertrack gap so that said tracks will appear to a normal drive as in FIG. 3, assuming the normal drive is correctly aligned and indexed to Track 19. In FIG. 3, which is a linearized diagram, the eccentric tracks prerecorded on the media are designated by the reference number 30. The path of the read head in the drive under test is designated by reference number 34. 32 is the signal induced in the head as would be seen by an oscilloscope. It is to be understood that in digital recording the amplitude of the envelope is proportional to the total amount of signal under the head. 36 indicates a measurement point comprising the leading edge of a zone of unreadable data wherein signals from both tracks appear under the head. This measurement point is central to the present invention. When the computer system, by use of suitable software, has located the sector contained in the lower of the two tracks and begun to read data into memory, no errors will be expected until point 36 is reached. At that time the data, returned to the system will no longer match the expected values because the interference from the second track will render the information unrecoverable. Since, the prerecorded eccentric tracks are at precisely known locations on the disk, and since the data bits are recorded at equal intervals along the track, and since the data stored in the data field of these tracks is precisely known, and since the point of failure can be precisely determined by comparing the returned data with the known contents of the data field, it is possible to compute the exact location of 36 for any degree of misalignment of the head 34. Briefly, when a drive is tested, the failure point 36 which results will correspond with a specific misalignment value.

If the tested drive is out of alignment, the point 36 will be shifted along the track by an amount that can be determined by formula or table look-up. FIG. 4 illustrates the case in which said prerecorded eccentric tracks 30 are read by a drive whose head is misaligned 2.4 mils (20% of a track width) toward the outside of the disk. For this configuration the point 36 has moved to the left a specific, determinable amount. Similarly, FIG. 5 illustrates the case in which said eccentric tracks are read by a drive whose head is out of alignment by 2.4 mils (20% of a track width) toward the inside (center) of the disk. For this configuration the point 36 has moved to the right a specific determinable amount. By comparing the returned data with the prerecorded data the point of failure 36 can readily be found. Said point of failure will occur at a certain bit position within the recovered sector data field. Said bit position corresponds to a specific position of the head in the drive under test with respect to the eccentric tracks. Hence the exact position of the head in the drive under test can be determined.

To determine the measurement sensitivity for the preferred embodiment, we note that the standard recording rate is $2.5 \times 10^5$ bits per second. The disk rotates at 300 RPM (5 revolutions per second). Under these conditions, there are $5 \times 10^4$ equally spaced bits per track. For an eccentric track offset of 0.01 inch (10 mils) the equation for the eccentric track curves in FIG. 3, FIG. 4 and FIG. 5 is $$y = .01 \sin\left(\frac{2\pi B}{5 \times 10^4}\right) + \text{vertical displacement}$$

inches, where B is a bit position along the track.

The rate of change (slope) of the curve is $$y' = \frac{.01 \times 2 \times \pi}{5 \times 10^4} \cos\left(\frac{2\pi B}{5 \times 10^4}\right)$$

inches per bit along the track.

Hence, in the region of the interference zone where the slope is maximum, the vertical displacement is changing at about $1.3\mu$ inches per bit. This corresponds with about 1 rail of offset for every 100 bytes of displacement along the track.

Positioner hysteresis (backlash) refers to differences in the rest position of the head when approaching a track from opposite directions. It can be measured by taking an alignment measurement following movement to the test track from the outside of the disk and comparing the result with an alignment measurement taken following movement to the test track from the inside of the disk. The average difference between these values represents the average positioner error due to hysteresis.

Positioner linearity and skew can be measured by prerecording a plurality of eccentric track pairs at various locations on the disk. For example, pairs of said eccentric tracks suitable for taking alignment measurements at tracks 0, 19 and 39 will provide the information necessary to determine the positioner path and compute the deviations from progress along a true radius. If all alignment values from said tracks are the same, the positioner path is perfectly linear. The best straight line fit through the measurement points determines the positioner skew and the deviations from that straight line determine the linearity.

Head clamping accuracy can be measured by prerecording a plurality of eccentric pairs which are located at different angular positions from the index (start of track) marker. In the preferred embodiment three such pairs recorded so that the offset directions are located 120 degrees apart will suffice. To compute clamping error, three alignment measurements are taken, one for each eccentric track pair. For a given alignment of the head under test, the three failure points will be nominally 120 degrees apart. A properly centered disk will exhibit the same alignment value at each of the measurement points. Any differences in the alignment values measured correspond to clamping errors. It is possible to inscribe a circle through the three positioner locations measured and by this means to compute the offset caused by incorrect disk clamping.

Although the present invention has been described in terms of the presently preferred embodiment, it is to be understood that such disclosure is not to be interpreted as limiting. Similar embodiments can be described for other standard disk drive types including 5.25 inch and 3.5 inch drives with 96 tracks per inch or 135 tracks per inch respectively. Various alterations and modifications will no doubt become apparent to those skilled in the art after having read the above disclosure. For example, different track locations or sector sizes can be chosen, different offset values, track widths or gap sizes may also be chosen to increase or decrease the measurement resolution. Accordingly, it is intended that the appended claims be interpreted as covering all alterations and modifications as fall within the true spirit and scope of the invention.

I claim:

1. A rotary alignment measurement disk for placement in a disk drive of an operational computer system which enables user of the computer system to measure a disk drive alignment, said measurement disk comprising:
   at least a pair of adjacent prerecorded tracks, consisting of a known pattern of equally spaced data bits, and having continuously variable radius, precisely positioned on said measurement disk with respect to a center of said disk and a reference index mark;
   said pair of the prerecorded tracks are continuously separated by a gap of about 8 mils which is less than a track width, and formatted with one or, more sectors such that prerecorded equally spaced data bits are readable by a read head without any errors when said read head is positioned directly over one of said prerecorded tracks; and during rotation of the disk the continuously variable radius causes the second one of the tracks to appear under said head, interfering with a data recovery and producing read errors; a location at which said read errors are produced is an indication of an amount of a head misalignment.

2. A method for measuring a head alignment comprising steps of:
   a) inserting an alignment measurement disk into a disk drive, said disk comprising at least one pair of adjacent prerecorded tracks consisting of a known pattern of equally spaced data bits, and having continuously variable radius; said pair of prerecorded tracks are continuously separated by a gap of about 8 mils which is less than a track width;

b) rotating said disk and positioning a read head on one of said prerecorded tracks to recover said known pattern of data bits;

c) reading said data bits by said read head from said one of the prerecorded tracks such that an initial sequence of data bits recovered will be without any error, and during the rotation of the disk said continuously variable track radius causes the second one of said tracks to be read by said read head, to interfere with the recovery of said known pattern of data bits and introduces read error whose onset is precisely related to the head alignment;

d) determining the point at which said onset of read errors begins by comparing the recovered known pattern of data bits with a reference known pattern;

e) computing a corresponding positional alignment from an angular position of the onset of read error began to occur and a known placement of the prerecorded tracks.

3. The method for measuring a head alignment recited in claim 2 further comprising steps of:

f) determining a positional linearity offset by measuring an exact alignment at two or more locations on said disk; and compensating for said positional linearity offset.

4. The method for measuring a head alignment recited in claim 2 further comprising steps of:

g) computing a clamping error by measuring an exact alignment at three or more angular positions on said disk; and compensating for said clamping error.

* * * * *